United States Patent
Saito et al.

(10) Patent No.: US 7,631,140 B2
(45) Date of Patent: Dec. 8, 2009

(54) DATA ACCESSING METHOD, DEVICE IN WHICH THE DATA ACCESSING METHOD IS EXECUTED AND RECORDING MEDIUM

(75) Inventors: Hiroshi Saito, Osaka (JP); Takeshi Otsuka, Hyogo (JP)

(73) Assignee: Panasonic Corporation, Osaka (JP)

( * ) Notice: Subject to any disclaimer, the term of this patent is extended or adjusted under 35 U.S.C. 154(b) by 558 days.

(21) Appl. No.: 10/587,239

(22) PCT Filed: Apr. 27, 2005

(86) PCT No.: PCT/JP2005/007996

§ 371 (c)(1),
(2), (4) Date: Jul. 26, 2006

(87) PCT Pub. No.: WO2005/109169

PCT Pub. Date: Nov. 17, 2005

(65) Prior Publication Data

US 2007/0168321 A1 Jul. 19, 2007

(30) Foreign Application Priority Data

May 7, 2004 (JP) ............................ 2004-138614

(51) Int. Cl.
*G06F 13/00* (2006.01)
(52) U.S. Cl. .................. 711/111; 711/103; 711/112; 707/2
(58) Field of Classification Search .............. 711/100, 711/103, 111–112; 707/2; 360/55
See application file for complete search history.

(56) References Cited

U.S. PATENT DOCUMENTS 5,434,618 A 7/1995 Hayashi et al.
6,279,069 B1 8/2001 Robinson et al.
7,054,790 B1 * 5/2006 Rich .......................... 702/186
2002/0031349 A1 3/2002 Hayashi

FOREIGN PATENT DOCUMENTS

EP 1 496 437 A3 1/2005
JP 06-350907 12/1994

(Continued)

OTHER PUBLICATIONS

European Search Report issued in European Patent Application No. EP 05736645.2 dated, Apr. 6, 2009.

*Primary Examiner*—Jasmine Song
(74) *Attorney, Agent, or Firm*—McDermott Will & Emery LLP

(57) ABSTRACT

To guarantee a data transfer rate irrespective of a performance of a memory card.

A parameter to show a data transfer efficiency is previously recorded in a recording medium 101 in which data is written per data size that can be increased and decreased stepwise and the data transfer efficiency is variable in accordance with the data size. Next, a data accessing apparatus 105 issues a parameter acquisition command to the recording medium 101. The recording medium 101 which received the parameter acquisition command transmits the parameter. The data accessing apparatus 105 collates the received parameter with the data transfer efficiency required in the data to be written/read to thereby select an optimum data size. Then, the data accessing apparatus 105 writes/reads the data to the recording medium 101 based on the selected optimum data size.

18 Claims, 8 Drawing Sheets

FOREIGN PATENT DOCUMENTS

| | | |
|---|---|---|
| JP | 6-350907 A | 12/1994 |
| JP | 10-207641 | 8/1998 |
| JP | 11-149352 | 6/1999 |
| JP | 11-149352 A | 6/1999 |
| JP | 11250672 A | 9/1999 |
| JP | 2001-222474 | 8/2001 |
| JP | 2003-32629 A | 1/2003 |
| WO | WO 03/088043 A | 10/2003 |

* cited by examiner

FIG.3 example of delay parameter

| write data size | delay time | average data rate |
|---|---|---|
| 32KB | 32.0msec | 1.00MByte/sec |
| 64KB | 32.5msec | 1.97MByte/sec |
| 128KB | 35.5msec | 3.61MByte/sec |
| 256KB | 48.5msec | 5.28MByte/sec |
| 512KB | 79.4msec | 6.45Mbyte/sec |

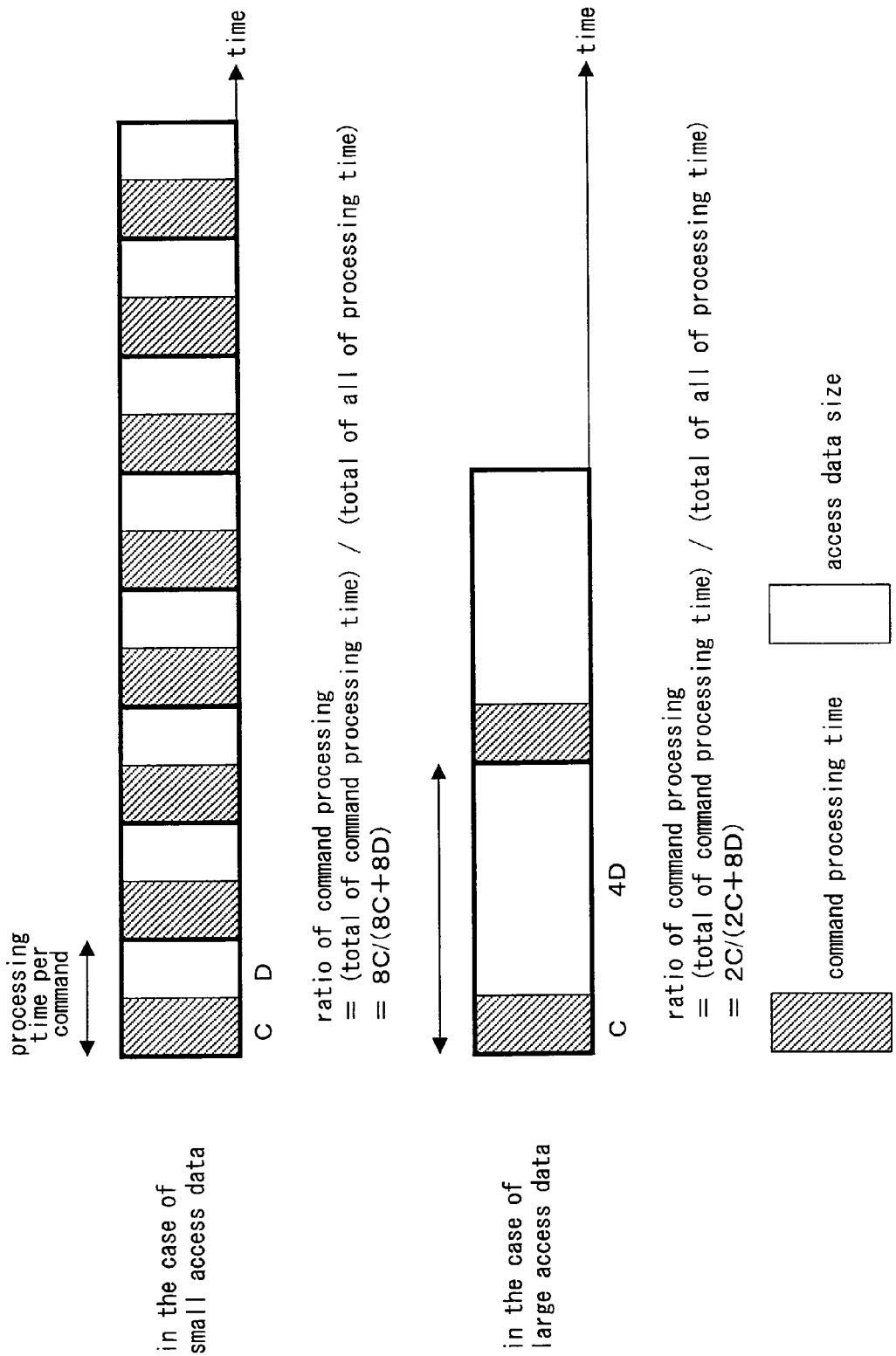

DATA ACCESSING METHOD, DEVICE IN WHICH THE DATA ACCESSING METHOD IS EXECUTED AND RECORDING MEDIUM

RELATED APPLICATIONS

This application is the U.S. National Phase under 35 U.S.C. §371 of International Application No. PCT/JP2005/007996, filed on Apr. 27, 2005, which in turn claims the benefit of Japanese Application No. 2004-138614, filed on May 7, 2004, the disclosures of which Applications are incorporated by reference herein.

FIELD OF THE INVENTION

The present invention relates to a technology for guaranteeing an accessing performance with respect to a memory-card type of recording medium.

DESCRIPTION OF THE RELATED ART

The different standards are given respectively to physical shapes and interfaces of recoding media of a memory-card type in which a non-volatile memory is utilized (hereinafter, referred to as memory card), such as SD card (registered trademark), compact flash (registered trademark) and memory stick (registered trademark). These recording media are used as not only recording media for a digital camera and but also widely used in other various devices.

As memory cards with a higher speed and a large capacity are increasingly commercialized, such type of mobile equipments where continuous snapshots of stationary images, and moving images and voice are recorded into their memory cards, were recently launched into the market (for example, see the Patent Literature 1). The non-volatile memory has some operation principles. In this specification, a recording/reproducing technology for the memory card is described referring to a semiconductor flash memory as an example, which is most frequently used these days.

First, as for a writing access, it is not possible in the semiconductor flash memory to overwrite data to an address where data has already been written while erasing the data already written, different from a magnetic recoding medium such a hard disk. In order to apparently overwrite the data, it is necessary to erase the data already written and then write new data. However, it is inefficient to have to erase the data in an entire memory region to rewrite the data there again every time when apart of the recorded data is randomly rewritten. Therefore, a memory card comprising a structure, that a memory region thereof is divided into a plurality of erasing blocks so that data can be erased and written in each of the erasing blocks, has been already commercialized. In the memory card, a write data having an arbitrary size is divided into a size corresponding to a size of the erasing block and thereby fragmented so that the fragmented data can be recorded in each of the erasing blocks.

In the case of writing the fragmented data smaller than the size of the erasing block in the semiconductor flash memory, the following steps

- temporarily reading out the data of the erasing block including an address to be written into a buffer;
- thereafter, erasing the data of the erasing block;
- temporarily overwriting the fragmented data to be written on the buffer; and
- writing back the data on the buffer to the erasing block, are necessary, so-called a Read Modify Write operation.

Therefore, a write delay time, which is equal to or more than a time length for writing the data having the size of the erasing block, is generated even though the size of the fragmented data is smaller than the size of the erasing block. The write delay time is a necessary time length from a time point at generation of a write/read processing command until a time point when the processing is completed.

FIG. 7A schematically shows a relationship between the size of the write data with respect to the memory card and the time length required for the writing process (write delay time). In FIG. 7A, a horizontal axis denotes the size of the write data, and a reference symbol E denotes the size of the erasing block. A vertical axis denotes the write delay time.

As is clear from the drawing, when the data read/write operation in the memory card is observed from interface of the memory card as a standpoint, the write delay time generated from a time point when a write command is given at a data size to the memory card till a time point when the data equivalent to the data size are all written (namely, a write processing time) is proportional to number of the erasing blocks (E) in which the data has been already written in addition to an overhead of a command processing. Therefore, the write delay time due to the increase of the write data size has such a physical property as increasing substantially step-wise as shown in FIG. 7A.

On the contrary, there is no limitation to a read access due to such a physical property as in the case of the erasing block in the semiconductor flash memory like the write access. FIG. 7B schematically shows a relationship between the size of the read data with respect to the memory card and a time length required for the reading process (read delay time). Horizontal and vertical axes respective denote the same as shown in FIG. 7A.

When the data read/write operation in the memory card is observed from interface of the memory card as a standpoint, the read delay time generated from a time point when a read command at a data size is given to memory card till a time point when the data equivalent to the data size are all read is equal to sum of transfer time in proportion to the overhead of the command processing and the size of the read data.

As is clear from FIG. 7B, when the size of the read data according to a command is small, the overhead of the command processing is unable to be neglected, and some influence appears in an application of the memory card required a higher speed than a certain level to the reading access.

FIG. 8 schematically shows a relationship between the overhead of the command processing and the size of the write-access or read-access data. The overhead of the command processing does not depend on the size of the access data and require a definite length of processing time. Therefore, the overhead of the command processing is relatively larger as the size of the access data is smaller.

In the memory card having such a recording/reproducing property, it is designed so as to write or read the data at a data rate enough to satisfy a demanded access performance. Therefore, it is not possible to fully use the performance of the memory card up to its limit in the current read/write mechanism of the memory card.

Patent Literature 1: No. 2003-32629 of the Publication of the Unexamined Japanese Patent Applications

DISCLOSURE OF THE INVENTION

Problems to be Solved by the Invention

There is an increasing demand for recording a moving image in a memory card and reproducing it in a state where a high image quality is maintained along with promotion of an image technology and a downsizing of an image device these days. In order to respond to the request, a recording/reproducing data rate of the memory card has a tendency to increase. However, there is no a unified standard because a size of an erasing block is different depending on the type of memory card (semiconductor flash memory).

A detailed specifications of a physical shape and interface have been standardized as external specifications of the memory card, such as SD card (registered trademark) compact flash (registered trademark) and memory stick (registered trademark), and they can be commonly used in different devices of manufacturers. Referring to internal specifications of the memory card, however, there is no regulation for the size of the erasing block. Therefore, it is different from one another in the respective memory cards by what kind of internal operation is necessary for recording data therein in the case of write data having an arbitrary size, which cannot be known from a data accessing apparatus.

The foregoing disadvantage has frequently caused problems in recording a high-quality moving image, in which a high speed is demanded. Even in the case of the memory cards according to the same standard, some of them are capable of the high-speed recording, while the others are not.

As a result, the following inconveniences, for example, are generated. In order to more efficiently take continuous images at a high speed in a digital still camera, the high-speed recording is necessary. The digital still camera having such a characteristic is provided with a temporarily buffer memory capable of a high speed processing and having a memory capacity corresponding to a maximum number of continuous shots. The performance of the continuous photographing is guaranteed in such a manner that data is temporarily stored in the temporary buffer and thereafter copied into the memory card when the images are continuously taken. In the foregoing structure, however, the data is copied into the memory card after the continuous photographing has been completed, which makes it impossible to eject the memory card for a certain period of time after the completion of the photographing. If the memory card is ejected from the digital still camera before the certain period of time passes after the completion of the photographing, the data on the way of the transfer process (being copied) is damaged.

The foregoing problem of ejecting the memory card can be solved if the data can be directly recorded in the memory card without using the buffer memory, however, it is difficult to guarantee a minimum access performance in the current standards of the memory card. The minimum access performance can be guaranteed in the current standards by heightening the performance of the memory card in the writing/reading speed. However, since the demanded minimum access performance is different in each application, the access performance having a level higher than necessary is provided in the memory card, it causes to increase a cost of the memory card due to over-specification.

In order to realize the recording/reproducing data rate demanded in the application and guarantee the access performance with respect to the memory card without increasing the costs of the memory card due to the over-specification, it is necessary to optimally control the size of the data to be accessed in each memory card based on information on the internal specifications of the memory card.

However, even if the data size is thus optimally controlled, there is no guarantee that the data accessing apparatus optimally designed for the current memory cards is capable of recording data in an optimal manner in any next-generation memory card whose performance is expected to be improved.

Therefore, it becomes necessary, for example, to upgrade software in the data accessing apparatus when the internal specifications of the memory card are changed.

As described, a technology corresponding to the application demanding the high-speed recording, in which the performance of the memory card is maximized, has not been established yet.

Means for Solving the Problems

In order to solve the foregoing problems, in the present invention, a data accessing apparatus and a data accessing method for reading and writing data to a recording medium, wherein the data is written per data size that can be increased and decreased stepwise and a data transfer efficiency at writing the data is variable according to the data size, comprising as follows.

More specifically, according to the present invention, a parameter, showing the data transfer efficiency at writing the data per data size in the recording medium, is previously recorded in the recording medium. Then, the data accessing apparatus transmits a parameter acquisition command to the recording medium when the data is written/read. Next, the recording medium receives the parameter acquisition command and transmits the parameter to the data accessing apparatus. Further, the data accessing apparatus receives the parameter and collates the parameter with the data transfer efficiency required in the data to be written/read by the data accessing apparatus, so that an optimum data size when the data is written/read is set. The data accessing apparatus writes/reads the data between itself and the recording medium based on the set optimum data size.

EFFECT OF THE INVENTION

According to the present invention, an optimum recording/reproducing access performance in compliance with a characteristic of each recording medium can be realized. Further, the recording/reproducing access performance with respect to a recording medium in future can be guaranteed without upgrading software on the side of the device.

BRIEF DESCRIPTION OF THE DRAWINGS

FIG. 3 is a corresponding table between the sizes of data written in the system region and delay times.

FIG. 8 shows a relationship between an overhead of a command processing and an access data size.

DESCRIPTION OF REFERENCE NUMERALS

Figure 1:
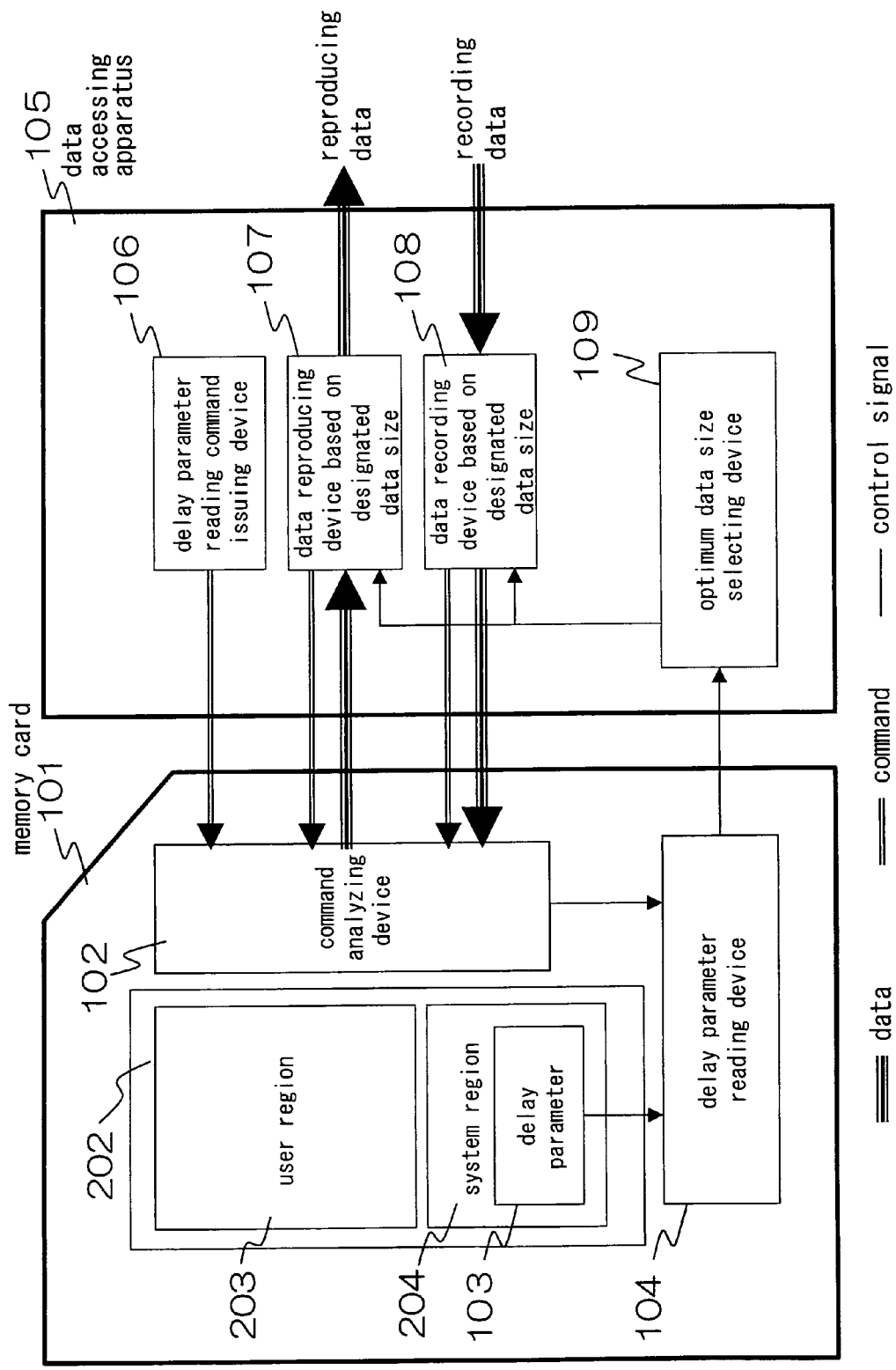
FIG. 1 is a block diagram of a memory card and a data accessing apparatus according to an embodiment 1 of the present invention.

101 memory card
102 command analyzing device 103 delay parameter
104 delay parameter reading device
105 data accessing apparatus
106 delay parameter read command issuing device
107 data reproduce device
108 data record device
109 optimum data size selecting device
202 memory region
203 user region
204 system region
601 memory card
602 command analyzing device
603 delay parameter
604 delay parameter reading device
605 optimum data size selecting device
607 delay parameter read command issuing device
608 data reproduce device
609 data record device

PREFERRED EMBODIMENTS OF THE INVENTION

Embodiment 1

The following is a detailed description of the embodiment 1 of the present invention referring to FIGS. 1-5 wherein a system structure for recording a digital video data of the DV method in real time is exemplified. FIG. 1 shows a relationship between a recording medium of a memory-card type (hereinafter, referred to as memory card) and a data accessing apparatus. A memory card 101 as a recording medium is a recording medium of a small card type that can be freely attached or removed to a data accessing apparatus 105, and comprises a command analyzing device 102, a delay parameter 103, and a delay parameter reading device 104. The devices 102, 103 and 104 consist of software installed in the memory card 101 in advance. In the present embodiment, a measure is constructed so as to read out the delay parameter read device 104 and transmit the read parameter to the data accessing apparatus 105.

The data accessing apparatus 105 comprises a delay parameter reading command issuing device 106, a data reproducing device 107 for reproducing data based on a designated data size, a data recording device 108 for recording the data based on a designated data size, and an optimum data size selecting device 109. The delay parameter reading command issuing device 106 consists of a "device for issuing a parameter acquisition command". The optimum data size selecting device 109 consists of a "device for selecting a data size at writing the data". The data reproducing device 107 and the data record device 108 consists of a "device for writing and reading the data". These devices, for example, consist of software installed in the data accessing apparatus 105 in advance, however, at least a part of the data reproduce device 107 and the data recording device 108 consists of hardware.

Figure 2:
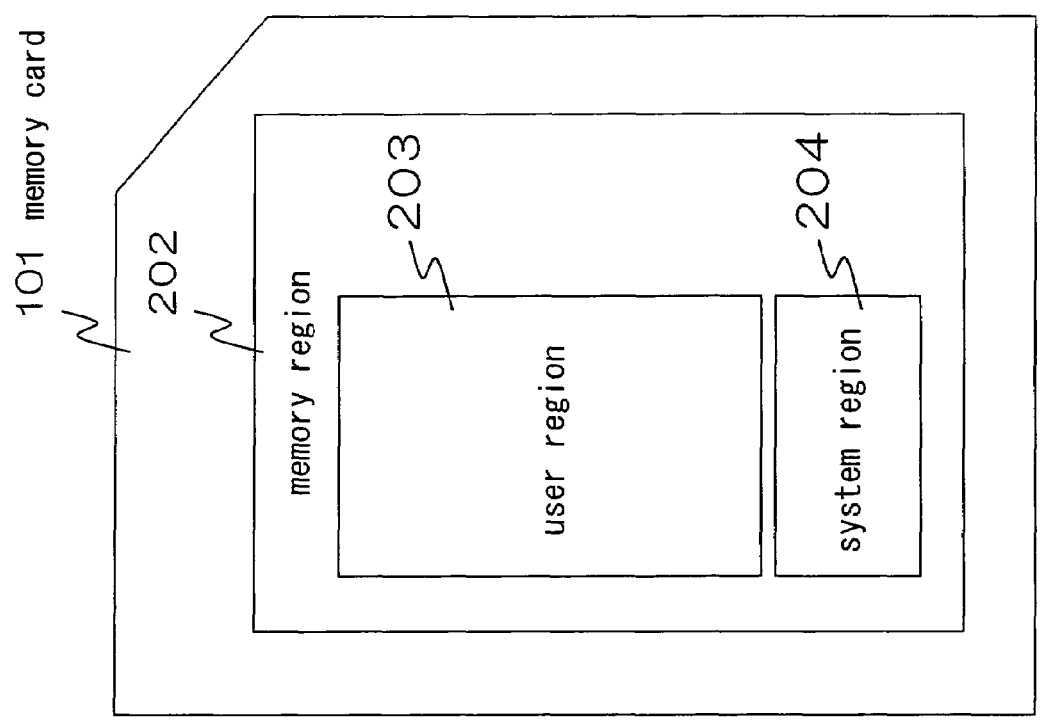
FIG. 2 shows a user region and a system region in the memory card.

A memory region 202 of the memory card 101 comprises a user region 203 and a system region 204 as shown in FIG. 2. The system region 204 is a region where an initial data is recorded when the memory card 201 is manufactured, and a user is not allowed to rewrite the data. The delay parameter 103 is stored in the system region 204 in advance. In the present embodiment, a memory unit of the parameter consists of the system region 204.

FIG. 3 is a table (relation table) showing a relationship between sizes of data written in the memory card (more specifically, semiconductor flash memory mounted in the memory card) and write delay times. A parameter showing a data transfer efficiency (in the present embodiment, referred to as delay parameter 103) at writing the data based on each data size comprises the table. FIG. 3 shows average data rates, which are, however, not included in the table. FIG. 3 shows that the average data rate can be uniquely obtained from the parameter. The average data rate is an example of the information showing the data transfer efficiency, more specifically, how much data can be transferred per second (M Byte/sec).

The write delay time is a necessary time length between a time point when a write/read processing command is generated and a time point when the processing is completed, as described earlier. As shown in FIG. 3, the write delay time changes depending on the data size. As the data size is larger, the delay time is increased. An information on a length of time required for writing/reading the data consists of the write delay time.

Figure 7B:
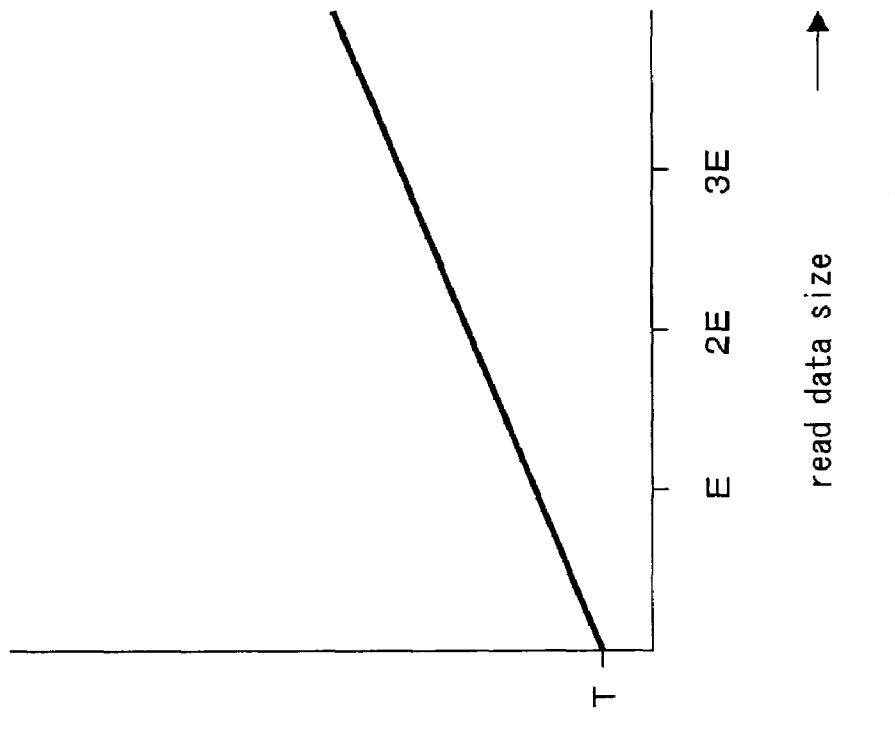
FIG. 7B is a schematic illustration of a relationship between the write data sizes and the delay times.
Figure 7A:
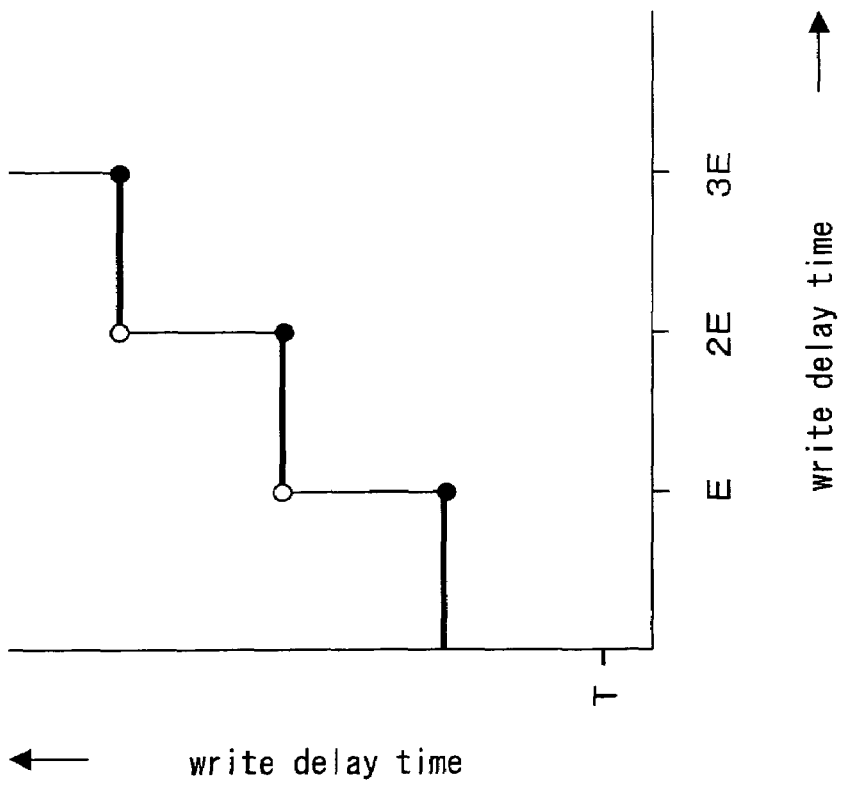
FIG. 7A is a schematic illustration of a relationship between the write data size and the delay time.

The write data size recorded as the delay parameter 103 corresponds to a size of an integral multiple of an erasing block size E of the memory card 101 (semiconductor flash memory) as is clear from the characteristic shown in FIGS. 7A and 7B. A delay parameter reading command for reading the delay parameter 103 is prepared for the memory card 101.

Figure 4:
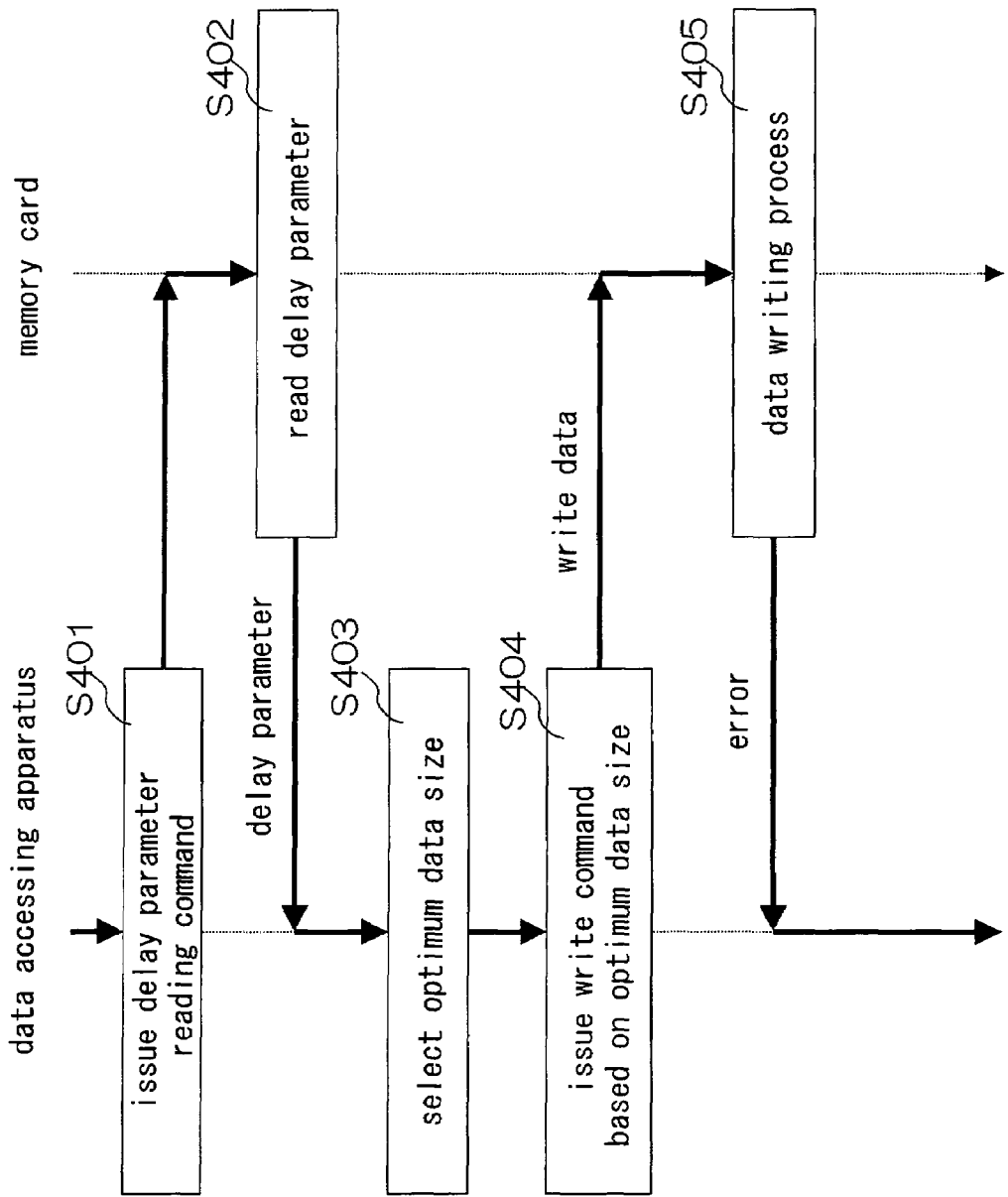
FIG. 4 is a processing flow of the memory card and the data accessing apparatus according to the embodiment 1.

Description is given below with respect to an operation and a data accessing method according to the embodiment 1 referring to a flow chart shown in FIG. 4. First, the delay parameter 103 is previously memorized in the memory card 101. After the previous processing has been done, the memory card 101 is attached to the data accessing apparatus 105.

The DV method is a compression recording method adopted in a number of home digital movies, wherein the data is transferred at the data rate of 25 Mbit/sec=3.125 MByte/sec. In order to record the data in the memory card 101 in real time without any frame dropping, such a transfer efficiency that the data can be written at the rate of 3.125 MByte per second without any interruption is necessary. The data accessing apparatus 105 which records the digital video data of the DV method in real time issues the delay parameter reading command to the memory card 101 at a time point earlier than a time point when the real-time data recording is necessary (S401). In the memory card 101, the command analyze device 102 extracts the delay parameter reading command, and reads the delay parameter 103 from the system region 204 in accordance with the extracted command and transmits the read command to the data accessing apparatus 105 (S402). In the data accessing apparatus 105, the write data size capable of achieving 3.125 MByte/sec is selected from the received delay parameter 103 in the optimum data size select device 109. Suppose it is a value of the delay parameter 103 as shown in FIG. 3, for example, the data accessing apparatus 105 judges that the data size (block) of 128 KB is appropriate in the writing process in order to guarantee the recording data rate of the DV method, and selects the data size as an optimum data size (S403).

More specifically, the optimum data size selecting device 109 divides the write data size composing of the delay parameter by the write delay time to thereby calculate the average data rate value (average data rate value=write data size/write delay time). The optimum data size selecting device 109 further selects a minimum write data size capable of achieving a desired average data rate regulated in an employed method or the like of the data to be transferred, as the optimum data size. In the foregoing example in which the desired average data rate is 3.125 MByte/sec, the optimum data size select device 109 selects the write data size of 128 KB, which exceeds the desired average data rate but is the minimum average data rate (3.61 MByte/sec in this case), as the optimum data size.

The data accessing apparatus 105 (more specifically, optimum data size selecting device 109) issues a write command so that the access is made by the data recording device 108 at 128 KB based on the foregoing selecting process of the data size (S404). The data record device 108 receives the write command and executes the data write process at the write data size of 128 KB to the memory card 101 (S405). Thereby, the digital video data of the DV method is always recorded in the memory card 101 at the write data size of 128 KB.

As described in the embodiment 1, the write data size satisfying the demanded performance can be optimally selected even in the memory cards 101 whose detailed internal specifications are different, thereby the recording access performance can be guaranteed.

Though description was given in the embodiment 1 referring to the example in which the digital video data of the DV method is recorded, however, the present invention is not limitedly applied to the example in which the digital video data of the DV method is recorded. Further, the reading process is exactly the same as in the description of the writing process up to the selection of the optimum data size, and different from only the part to set the optimum data size selected by the data reproduce device 107 and access the data for reproduction.

Embodiment 2

Figure 5:
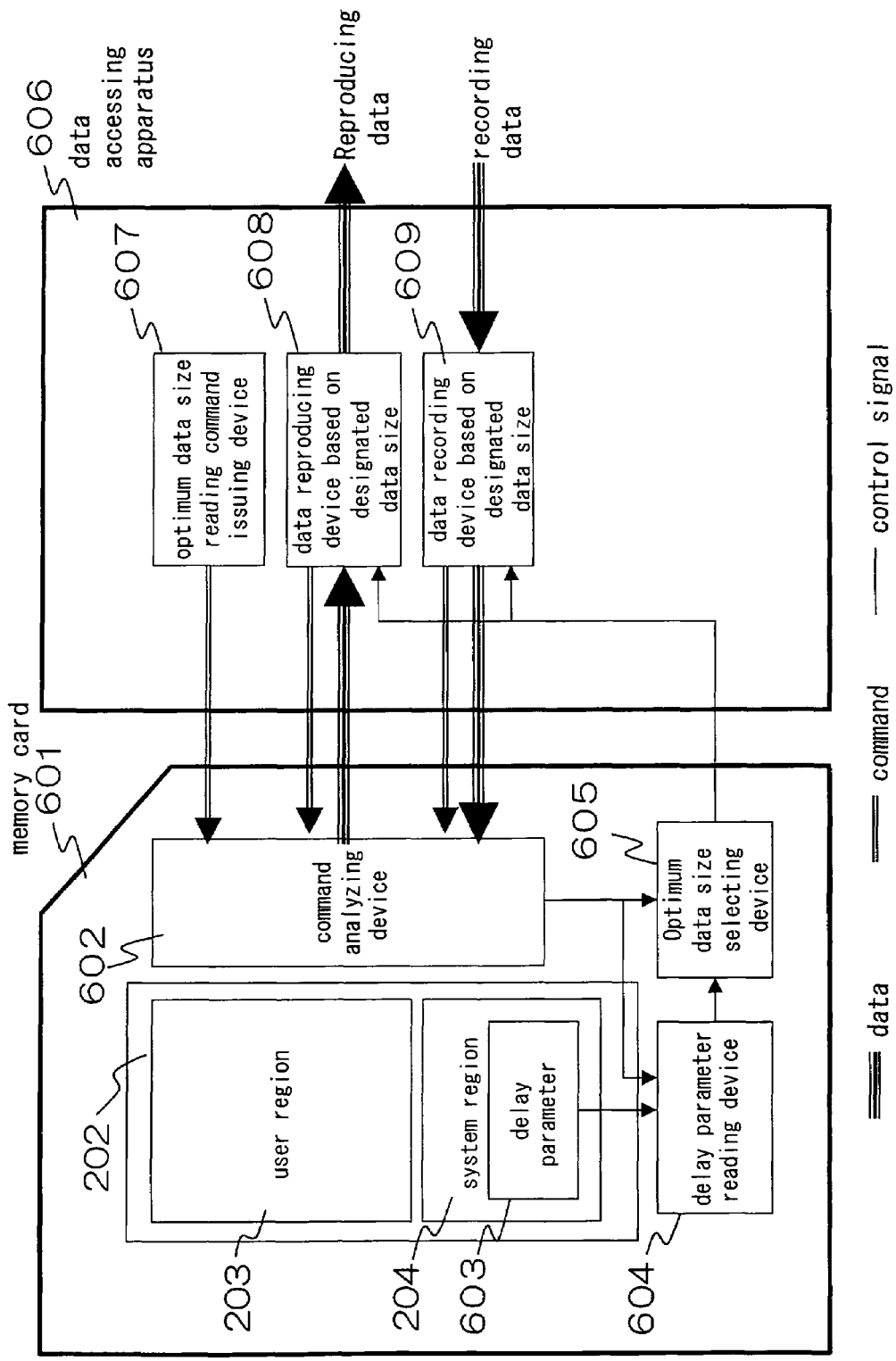
FIG. 5 is a block diagram of a memory card and a data accessing apparatus according to an embodiment 2 of the present invention.
Figure 6:
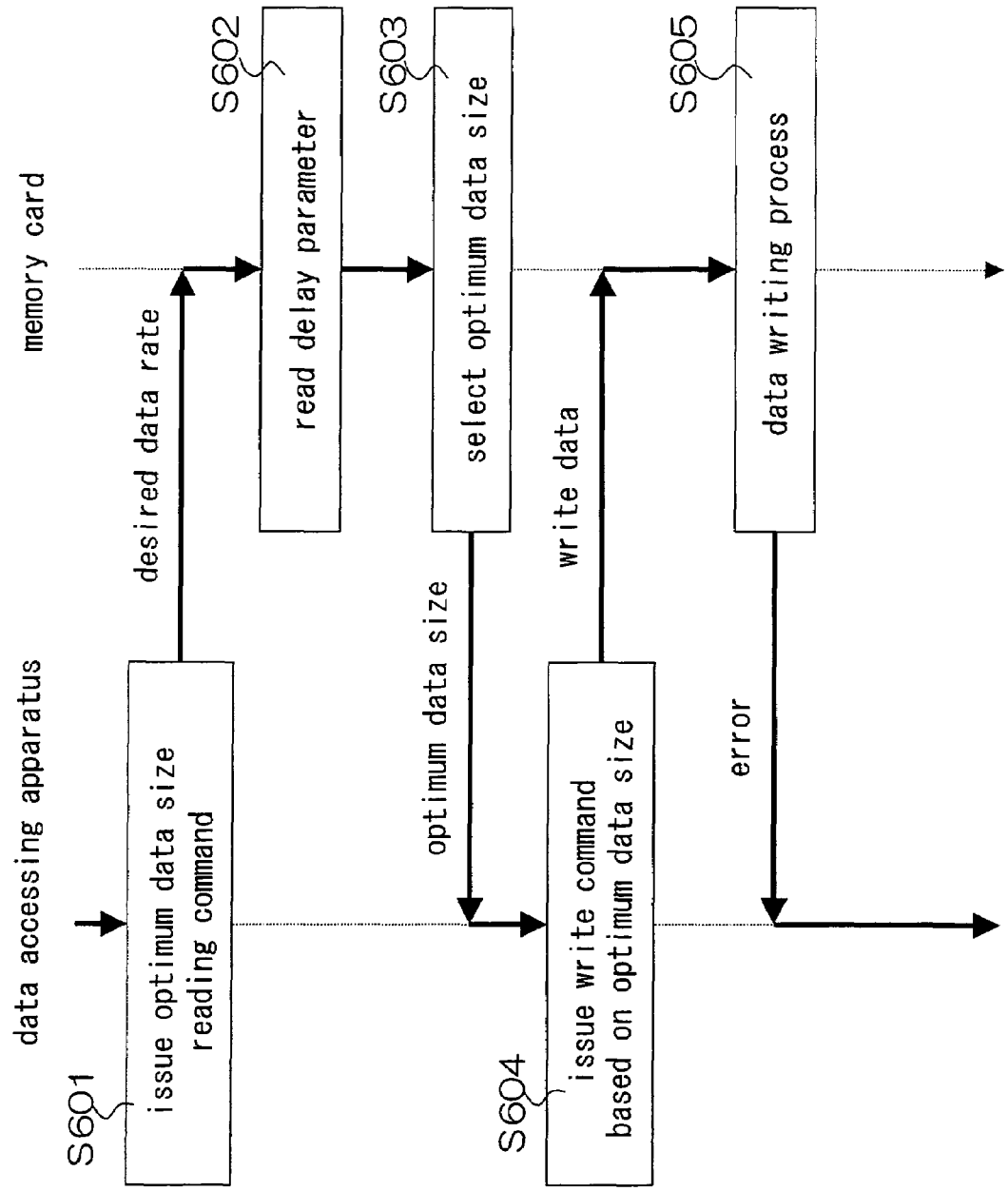
FIG. 6 is a processing flow of the memory card and the data accessing apparatus according to the embodiment 2.

Referring to FIGS. 5 and 6, an embodiment 2 of the present invention is described. A basic structure according to the embodiment 2, which is the same as described in the embodiment 1 referring to FIGS. 1-4, is not described again below.

FIG. 5 shows a relationship between a memory card and a data accessing apparatus. A memory card 601 comprises a command analyzing device 602, a delay parameter 603, a delay parameter read device 604, and an optimum size select device 605. The respective devices 602, 604 and 603 consist of software previously installed in the memory card 601, for example. A data accessing apparatus 606 comprises an optimum data size reading command issuing device 607, a data reproduce device 608 for reproducing the data based on a designated data size, and a data record device 609 for recording data based on a designated data size. The respective devices 606-609 consist of software previously installed in the data accessing apparatus 606. At least a part of the data reproduce device 608 and the data recording device 609 is constructed from hardware.

The optimum data size reading command issuing device 607 constitutes "a device to transmit an information showing a data transfer efficiency required in the data to be written/read by the data accessing apparatus to the recording medium". The data reproduce device 608 and the data record device 609 constitute "a device to set a data size at writing the data based on an information showing an optimum data size transmitted by the recording medium which received the information showing the required data transfer efficiency and writing/reading the data based on the set data size with respect to the recording medium". An optimum data size read command constitutes the "information showing the required data transfer efficiency".

The delay parameter read device 104 receives the information showing the required data transfer efficiency transmitted by the data accessing apparatus and collates the received information with a parameter memorized in a memory unit to thereby constitute "a device to select the optimum data size at writing the data" and "a device to transmit the information showing the selected data size to the data accessing apparatus".

In the embodiment 2, the optimum data size read command in which a desired delay time is used as an argument is generated in place of the delay parameter read command in the embodiment 1, and previously memorized in the memory card 601. The embodiment 2 is further different from the embodiment 1 in that the optimum data size select device 605 as the device for selecting the optimum data is provided in the memory card 601.

An operation and a data accessing method according to the embodiment 2 are described below referring to a flow chart shown in FIG. 6. The delay parameter 103 is memorized in the memory card 601 in advance. After the foregoing previous processing is executed, the memory card 601 is attached to the data accessing apparatus 606.

The data accessing apparatus 606 for recording the digital video data of the DV method in real time issues the optimum data size reading command, in which a desired average data rate is used as the argument, to the memory card 601 (S601). The optimum data size reading command consists of the information showing the required data transfer efficiency as described earlier. The command more specifically denotes the data transfer efficiency necessary for the method of the data to be transferred to the memory card 601. The optimum data size reading command issuing device 607 generates and issues the optimum data size reading command denoting the data size optimum for the data transfer from the information on the method of the data and the like to be transferred to the memory card 601.

The memory card 601 reads the optimum data size reading command based on a command analysis by the command analyze device 602. The delay parameter read device 604 reads the delay parameter 603 recorded in the system region 204 in accordance with the read-out reading command (S602). The optimum data size select device 605 calculates the average data size value based on the read delay parameter 603. The delay parameter 603 comprises, for example, a table (object table) showing a relationship between settable write data sizes and delay times in the respective write data sizes in the same manner as in the embodiment 1.

The optimum data size select device 605 calculates the average data size value by dividing the write data size by the delay time (average data rate value=write data size/delay time). The optimum data size select device 605 further selects a minimum write data size capable of achieving a desired average data rate designated by the argument in the optimum data size reading command as the optimum data size (S603). In the case where the desired average data rate designated by the argument is 3.125 MByte/sec, the optimum data size select device 605 selects the write data size of 128 KB, which exceeds the desired average data rate but is the minimum average data rate (3.61 MByte/sec in this case), as the optimum data size.

The optimum data size select device 605 transmits an information showing the selected optimum data size to the data accessing apparatus 606. The data accessing apparatus 606 receives and obtains an information showing the write data size which guarantees the writing process at the desired data rate (128 KB in the foregoing example) from the memory card 601 as a return value of the optimum data size reading command issued by the optimum data size reading command issuing device 607. Thereby, the data accessing apparatus 606 issues a write command allowing the data access at 128 KB to the data record device 609 and the data reproduce device 608 (S604). The data record device 609 receives the write command, and always accesses the digital video data of the DV method in the memory card 601 for recording at the write data size of 128 KB (S605).

As described above, according to the present invention, the write data size satisfying the demanded performance can be optimally selected even in the memory cards 101 whose detailed internal specifications are different, and then the recording access performance can be guaranteed.

The embodiment 2 was described referring to the example in which the digital video data of the DV method is recorded, however, the present invention is not limitedly applied to the example in which the digital video data of the DV method is recorded. Further, the reading process is exactly the same as in the description of the writing process up to the selection of the optimum data size, and different from only a part to set the optimum data size selected by the data reproducing device 608 and access the data for reproduction.

The present invention can be utilized in an application wherein it is necessary to guarantee a recording/reproducing access performance with a memory card in which a non-volatile memory is mounted used as a recording medium.

What is claimed is:

1. A data accessing apparatus for writing/reading data to a recording medium in which the data is written per data size that can be increased and decreased stepwise, a data transfer efficiency at writing the data is variable depending on the data size, and a parameter showing the data transfer efficiency at writing the data per the data size is recorded, comprising:
   a device for issuing a parameter acquisition command to the recording medium;
   a device for selecting an optimum data size at writing the data by collating the parameter transmitted by the recording medium which received the parameter acquisition command with the data transfer efficiency required in the data to be written/read by the data accessing apparatus; and
   a device for writing/reading the data with respect to the recording medium based on the selected optimum data size.

2. A recording medium wherein the data is written in/read from per the data size that can be increased and decreased stepwise by the data access apparatus of claim 1, comprising:
   a memory unit in which the parameter is recorded; and
   a device for reading the parameter memorized in the memory unit in response to reception of the parameter acquisition command transmitted by the data accessing apparatus and transmitting the read parameter to the data accessing apparatus.

3. The data accessing apparatus of claim 1, wherein the parameter is a table in which the data size and an information on a length of time required for writing/reading the data to the recording medium based on the data size are corresponding to each other.

4. The data accessing apparatus of claim 1, wherein the recording medium is a semiconductor memory, and the data size is a size corresponding to an integral number of times of an erasing block size of the recording medium.

5. The data accessing apparatus of claim 1, wherein the recording medium is a recording medium of a card type that can be freely attached or removed to the data accessing apparatus.

6. A data accessing apparatus for writing/reading data to a recording medium in which the data is written per data size that can be increased and decreased stepwise, a data transfer efficiency at writing the data is variable depending on the data size, and a parameter showing the data transfer efficiency at writing the data per the data size is recorded, comprising:
   a device to transmit an information showing the necessary data transfer efficiency required in the data to be written/read by the data accessing apparatus; and
   a device to set the data size at writing the data based on an information showing an optimum data size transmitted by the recording medium which received the information showing the required data transfer efficiency so as to write/read the data to the recording medium based on the set data size.

7. A recording medium wherein the data is write/read per the data size that can be increased and decreased stepwise by the data access apparatus of claim 6, comprising:
   a memory unit in which the parameter is recorded; and
   a device for receiving the information to show the data transfer efficiency transmitted by the data accessing apparatus and selecting the optimum data size at writing the data by collating the information showing the required data size transfer efficiency with the parameter memorized in the memory unit; and
   a unit to transmit an information on the selected optimum data size to the data accessing apparatus.

8. The data accessing apparatus of claim 6, wherein the parameter is a table in which the data size and an information on a length of time required for writing/reading the data to the recording medium based on the data size are corresponded each other.

9. The data accessing apparatus of claim 6, wherein the recording medium is a semiconductor memory, and the data size is a size corresponding to an integral times of an erasing block size of the recording medium.

10. The data accessing apparatus of claim 6, wherein the recording medium is a recording medium of a card type that can be freely attached or removed to the data accessing apparatus.

11. A data accessing method wherein the data accessing apparatus writes/reads data to a recording medium in which the data is written per data size that can be increased and decreased stepwise and a data transfer efficiency at writing the data is variable in accordance with the data size, comprising:
   a step in which a parameter showing the data transfer efficiency is previously recorded into the recording medium at writing the data into the recording medium per the data size;
   a step in which the data accessing apparatus transmits a parameter acquisition command to the recording medium at writing/reading the data;
   a step in which the recording medium that received the parameter acquisition command transmits the parameter to the data accessing apparatus;
   a step in which the data accessing apparatus that received the parameter collates the parameter with the data transfer efficiency required in the data to be written/read by the data accessing apparatus to thereby set an optimum data size at writing the data; and
   a step in which the data accessing apparatus writes/reads the data between itself and the recording medium based on the set optimum data size.

12. The data accessing method of claim 11, wherein the parameter is a table in which the data size and an information on a length of time required for writing/reading the data to the recording medium based on the data size are corresponded each other.

13. The data accessing method of claim 11, wherein the recording medium is a semiconductor memory, and the data size is a size corresponding to an integral times of an erasing block size of the recording medium.

14. The data accessing method of claim 11, wherein the recording medium is a recording medium of a card type that can be freely attached or removed to the data accessing apparatus.

15. A data accessing method wherein the data accessing apparatus writes/reads data to a recording medium in which the data is written per data size that can be increased and decreased stepwise and a data transfer efficiency at writing the data is variable in accordance with the data size, comprising:

a step in which a parameter showing the data transfer efficiency is previously recorded into the recording medium at writing the data into the recording medium per the data size;

a step in which the data accessing apparatus transmits an information to show the data transfer efficiency required in the data to be written/read by the data accessing apparatus to the recording medium at writing the data;

a step in which the recording medium that received the information to show the required data transfer efficiency collates the information concerned with the parameter to thereby select an optimum data size at writing the data;

a step in which the recording medium transmits an information to show the selected optimum data size to the data accessing apparatus; and a step in which the data accessing apparatus that received the information to show the optimum data size sets the data size at writing the data based on the information showing the optimum data size to thereby write/read the data between itself and the recording medium.

16. The data accessing method of claim 15, wherein the parameter is a table in which the data size and an information on a length of time required to write/read the data to the recording medium based on the data size are corresponded each other.

17. The data accessing method of claim 15, wherein the recording medium is a semiconductor memory, and the data size is a size corresponding to an integral times of an erasing block size of the recording medium.

18. The data accessing method of claim 15, wherein the recording medium is a recording medium of a card type that can be freely attached or removed to the data accessing apparatus.

* * * * *